(No Model.)

J. M. McNAMAR.
TIME REPORT SHEET.

No. 436,147. Patented Sept. 9, 1890.

UNITED STATES PATENT OFFICE.

JAMES M. McNAMAR, OF TOLEDO, OHIO.

TIME-REPORT SHEET.

SPECIFICATION forming part of Letters Patent No. 436,147, dated September 9, 1890.

Application filed May 6, 1889. Serial No. 309,682. (No model.)

*To all whom it may concern:*

Be it known that I, JAMES M. MCNAMAR, a citizen of the United States, residing at Toledo, in the county of Lucas and State of Ohio, have invented certain new and useful Improvements in Watchmen's Time - Report Sheets; and I do hereby declare that the following is a full, clear, and exact description of the invention, which will enable others skilled in the art to which it appertains to make and use the same, reference being had to the accompanying drawing, and to the letters of reference marked thereon, which form part of this specification.

My invention relates to an improved time-report sheet, and has for its object to provide a convenient and accurate means for recording the same and for detecting inattention to duty on the part of the watchman, with a correct report of the same, by means of a time-record that shall not only by its arrangement allow of a correct report from the watchman of his exact location at any given time, but shall be separable to allow the report to be submitted and kept as a permanent record by the proprietor of the premises being watched.

The invention consists in forming a time-register for watchmen's reports from certain specific locations to a central office, said register being segregable by sections, each section embracing a report from a particular locality.

In the drawing is illustrated a sufficient portion of a time-register to illustrate my invention, the figure being a plan view of a series of report-blanks for different subscribers to the system.

In the drawing, A designates a horizontal heading-space, into which is written the name of the particular subscriber to the system.

B represents a spacing in parallel relation with spacing A, divided into a number of blanks, into which is written the particular locality from which the report is received.

C represents a spacing having a corresponding division with spacing B, and in parallel relation therewith, into which is written the number of the signal-box from which the reports are received.

D represents a spacing at right angles to spacing A, and which is divided into blanks to represent units of time in the illustration. The blanks by the particular figures written therein represent the time from 5.30 to 6.30, the figures from six to six indicating the hours and the intermediate blanks representing the half-hours, this arrangement being for the purpose of convenience and economy of time in recording the time-reports when received from the watchmen.

E designates spaces into which are recorded the time in fractions of an hour that each report is received from the signal-boxes when operated by the watchmen.

In illustration of the system as recorded in the register just described, a communication is established between the signal in the building or premises to be watched and the central office, preferably by electric-telegraph wire and electric transmitting and receiving apparatus, and in order to furnish a duplicate register—one for the home office and one for the subscriber—the signal-boxes when operated by the watchmen are made to transmit electrically signals which produce on the receiving-instrument at the central office the numerals indicating the location of said boxes, at which time the report is entered upon the register under the same numeral and indicating the exact time received.

To particularize more fully, referring to the subscriber at the upper left-hand corner of the drawing we see that the location is the building and premises of "The Toledo Carriage Woodwork Company," and that the watchman at this point is expected to turn in a report from "engine-room," alarm or signal-box No. 66; "finishing-room," box 516; "frame, third floor," box 354; "frame, first floor," box 152; "boiler-room," box 66. This being the system and arrangement for each subscriber relatively to the locations from which the reports are to be sent, the signal-boxes are placed at such points throughout the building or premises as the subscriber desires. The watchman is to visit each location in order to prevent fire or theft, a schedule of time for visiting such points being furnished the watchman and a copy of the same given the central office.

It will be seen by the numerals in squares E in the same illustration that the numerals 40 at the right, in the upper line and directly under the numeral 66, indicate that a report was received from the watchman from box 66 at the boiler-room at 5.40. The numerals 45 under the numerals 152 indicate that a report was received from box 152, "frame, first floor," at 5.45, the next report being received from the same box 66 at 5.56, "engine-room;" and referring to the next line below or opposite the numeral indicating the hour of six, the numeral 9 below the numerals 516 indicate that a report was received from the watchman from box 516, "finishing-room," at six o'clock and nine minutes, this order being observed during the entire period of duty from 5.30 p. m. until 6.30 a. m., or any hours agreed upon. The arrangement is such that the watchman makes a complete round of the premises in a given time. These records being made at the central office as the reports are being sent in by the watchmen of the several buildings, the division of time just described enables the operator to rapidly and correctly record the same.

As the spaces E divide the time into hours and half-hours, the intermediate intervals are all that it is necessary to record. The operation is quickly performed. Should a watchman fail to report from a particular room or station in the building or premises, the operator at the central office notes such fact at once, and the necessary steps are taken to ascertain the cause of delay or failure to report.

When each sheet is completed it may be divided into individual reports to be delivered to the individual subscribers for their inspection, if desired.

What I claim is—

As an improved article of manufacture, the herein-described segregable time-report, comprising a sheet provided with a horizontal spacing A, containing the names of subscribers, a horizontal spacing B, containing the locations of portions of the building to be visited, a third horizontal spacing C, containing the numbers of the alarm-boxes, and a field extending the entire width of the sheet and divided into a series of horizontal spacings E of equal size, and a vertical spacing D, having in each alternate space a numeral for designating an interval of time, substantially as and for the purpose specified.

In testimony that I claim the foregoing as my own I hereby affix my signature in presence of two witnesses.

JAMES M. McNAMAR.

Witnesses:
VINCENT D. GREENE,
WILLIAM WEBSTER.